United States Patent [19]
Pfaffmann et al.

[11] Patent Number: 4,996,826

[45] Date of Patent: Mar. 5, 1991

[54] APPARATUS AND METHOD FOR SEALING A LID ONTO A CONTAINER

[75] Inventors: George D. Pfaffmann, Farmington Hills; Norbert R. Balzer, Warren, both of Mich.; Charles S. Kubis, Palso Heights; John Walter, Evergreen Park, both of Ill.

[73] Assignee: Continental Can Company, Inc., Norwalk, Conn.

[21] Appl. No.: 476,247

[22] Filed: Feb. 7, 1990

Related U.S. Application Data

[62] Division of Ser. No. 254,837, Oct. 7, 1988, Pat. No. 4,941,306.

[51] Int. Cl.⁵ .................. B65B 51/22; B65B 51/14; B65B 7/28
[52] U.S. Cl. ............................. 53/478; 53/485; 53/DIG. 2; 156/69
[58] Field of Search ........... 156/69, 379.7; 53/373, 53/510, 329, 306, 308, 281, 75, 300, 478, 485, DIG. 2

[56] References Cited

U.S. PATENT DOCUMENTS

| | | | |
|---|---|---|---|
| 3,338,027 | 8/1967 | Amberg et al. | 53/478 X |
| 3,398,500 | 8/1968 | Inman | 53/510 X |
| 3,418,193 | 12/1968 | Hallowell, Jr. | 53/373 X |
| 3,452,513 | 7/1969 | Owens, Jr. | 53/510 X |
| 3,548,140 | 12/1970 | O'Neill | 53/478 X |
| 3,549,440 | 12/1970 | Adcock et al. | 53/478 X |
| 3,723,212 | 3/1973 | Casper | 53/478 X |
| 3,755,987 | 9/1973 | Dardaine et al. | 53/373 X |
| 3,815,314 | 6/1974 | Pollock et al. | 53/478 X |
| 3,908,334 | 9/1975 | Rychiger | 53/510 X |
| 3,909,326 | 9/1975 | Renck | 53/478 X |
| 4,504,350 | 3/1985 | Joo | 156/379.7 X |
| 4,583,350 | 4/1986 | Artusi et al. | 53/373 X |
| 4,691,500 | 9/1987 | Danforth et al. | 156/69 X |
| 4,707,213 | 11/1987 | Mohr et al. | 53/373 X |
| 4,816,110 | 3/1989 | Foldesi et al. | 53/DIG. 2 X |

Primary Examiner—Horace M. Culver
Attorney, Agent, or Firm—Body, Vickers & Daniels

[57] ABSTRACT

A method and apparatus for sealing a flat lid with a lower layer of heat bondable material onto the upper, generally flat surface of a flange extending around the periphery of an access opening in a container of the type used to store a substance suscseptible to deterioration when exposed to atmosphere for a prolonged time such as prepared foods, which method and apparatus moves a separate and distinct heating unit with a downwardly facing heating ring in a preselected path, preferably circular in shape, between first and second positions, includes a generally fixed high frequency power supply for energizing said heating ring, connects this fixed high frequency power supply to the individual heating rings of the moving heating unit only when the unit is moving between the first and second positions, and energizes the power supply only while the heating unit is moving between the first and second positions. The ring is forced against the lid as the power supply is energized and is released from the ring from the lid after the power supply has been de-energized and before the moving heating unit reaches the second position. Preferably the ring is an inductor and the plurality of heating units are carried by a turret to define individual heating stations on the turret which stations rotate to selectively energize the individual heating units by the single fixed high frequency power supply whereby single power supply energizes a plurality of separate heating stations.

2 Claims, 8 Drawing Sheets

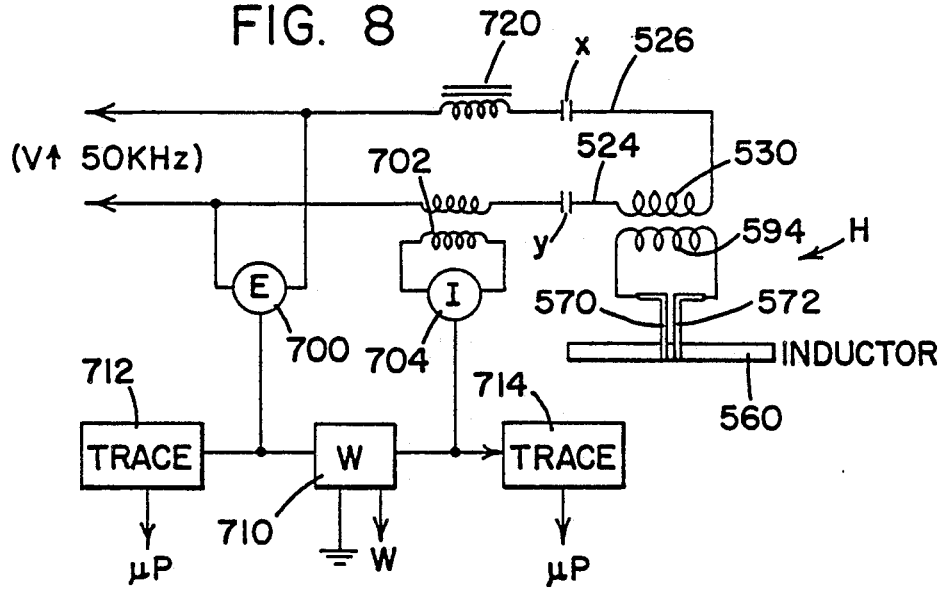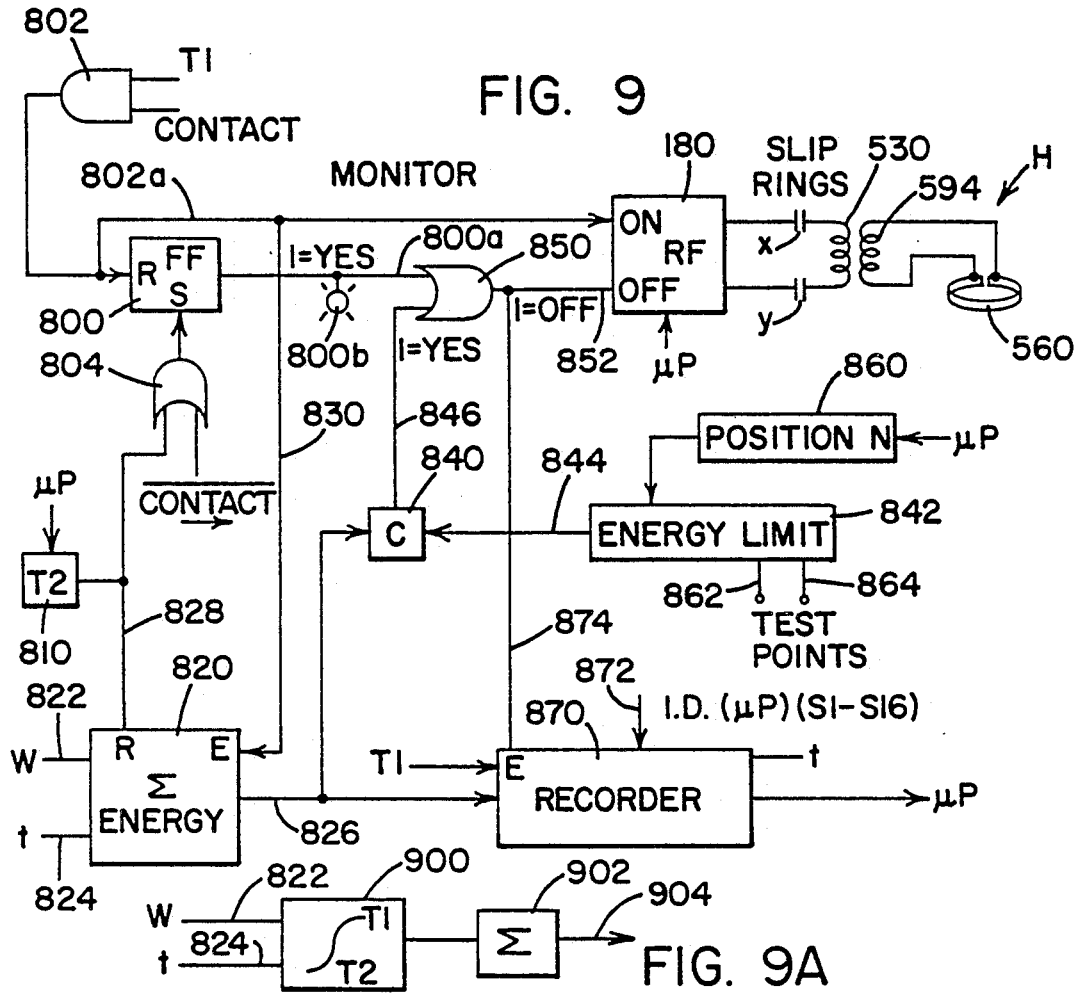

APPARATUS AND METHOD FOR SEALING A LID ONTO A CONTAINER

This is a division, of application Ser. No. 254,837 filed Oct. 7, 1988 and now U.S. Pat. No. 4,941,306.

DISCLOSURE

The present invention relates to the art of packaging a mass produced substances, such as food products, so they will have a long shelf life, and more particularly to an improved apparatus and method for heat sealing a lid onto a container filled with such products.

INCORPORATION BY REFERENCE

Mohr 4,707,213 discloses an apparatus for sealing a generally flat lid with a lower layer of heat bondable material onto a flange surface extending around the periphery of an access opening to a container for hermetically storing a substance susceptible to deterioration when exposed to atmosphere for a prolonged time, such as a prepared food product, by using a non-water cooled inductor for pressing the lid against the flange and then inductively heating a metal layer on the laminate from which the lid is stamped to raise the temperature of the lower heat bondable material of the lid liminate to the sealing temperature as pressure is maintained, so that the lid is sealed onto the container by setting of the heat bondable material. This patent discloses background information to which the present invention is directed and is incorporated herein for the purpose of illustrating this general background information and environment of the present invention.

BACKGROUND OF THE INVENTION

Most prepared food products, after they are prepared and ready for mass distribution through retail outlets, must be packaged, distributed and sold in a manner to prevent deterioration over prolonged periods of time, referred to as "shelf life". Over the years the food industry has developed many packaging and distributing processes for accomplishing the objective of instilling food substances with a long shelf life. Cans, jars, frozen or refrigerated containers, and hermetically sealed plastic packages or containers are the more common processes and packaging for this purpose. These procedures have presented certain disadvantages generally associated with either the expense of the packaging or the cost of refrigerating, freezing and maintaining the pressuring condition of the food packages as they progress through the retail channels. In view of this situation, there has been a tremendous effort in the food industry to develop inexpensive, serving size containers for prepared foods which need not be frozen and/or refrigerated to accomplish an acceptable shelf life. One of the more successful approaches in the quest by the food industry to accomplish this objective has been the development of a plastic container having an appropriate gas barrier layer to prevent oxygen migration through the walls of the container and incorporating an upper lid formed from a laminate and also having an oxygen migration barrier which is heat bonded by an appropriate bonding material layer over the access opening of the plastic container. By merely placing the prepared food into the container and heat bonding the lid thereto, oxygen cannot enter the container through the container itself or through the upper lid. By removing oxygen from the container before the lid is sealed onto the container either by drawing a vacuum, purging the container with asn iner gas and/or both of these procedures, oxygen is excluded from association with the packaged food product to accomplish a long, acceptable shelf life. This new packaging concept is now becoming quite common and is used for many products. In accordance with one known procedure, the laminated lid is sealed onto the container by employing a heated ring forced against the lid so that the heat energy of the ring is conducted to the layer of heat bondable material between the lid and container flange whereby the heat bondable layer is heated and seals the lid onto the container in a path of "footprint" defined by the shape of the ring. Although this procedure does operate and is being widely employed in the food industry, there are distinct disadvantages. Heating of the ring for conducting heat energy from the ring to the heat bondable material cannot be accomplished rapidly. In addition, the ring does not cool rapidly. It is critical to keep the ring in place until the seal is set. Consequently, the heating cycle for heating and allowing the ring to cool is relatively long. Further, uniform heating around the surface of the ring and adjustment of the heating effect to accomplish optimum sealing is difficult, if not impossible, to accomplish.

In view of the substantial disadvantages associated with a heated ring to heat the bonding material by conduction for sealing the lid onto the container, a relatively new technique has developed wherein the ring is an inductor and a metal layer is incorporated into the laminated sheet material forming the lid, so that as a high frequency is applied to the inductor, the metal layer in the lid material itself is heated only in the area adjacent the inductor. By forcing the inductor against the lid, induction heating of the metal in the lid directly below the inductor causes sealing of the heat bondable material sandwiched between the lid and the container. Immediately upon de-energizing the inductor, heat is removed from the metal layer of lid and final sealing is accomplished. In this manner, accurate control may be maintained over the heat sealing function so that the lid can be economically and rapidly applied onto the container to accomplish sealing of the container in a fashion which can be repeated from one container to the next. Mohr 4,707,213 illustrates induction heating of a metal layer for the purpose of sealing a lid onto the container which has proven successful, reliable and repeatable.

THE INVENTION

The present invention relates to improvements over prior induction heating apparatus and methods for heat sealing the metallized lid over a plastic container to provide a hermetically sealed, mass produced container for substances which are susceptible to deterioration when exposed to atmosphere for a prolonged time, such as prepared food products. These improvements have been developed for converting a induction heating heat seal apparatus and method into an efficient, high speed machine to control the operating parameters of the induction heating process while maintaining the overall cost of the machine relatively low. Thus, the present invention is directed toward improvements in an induction heating type sealing apparatus and method, which improvements produce uniform results, at high speed, without the need for extremely expensive equipment.

The invention will be described with particular reference to improvements in an induction heating type of sealing apparatus; however, certain aspects of the invention have broader applications and are applicable even to conduction type heating apparatus over which the induction heating process is a substantial advance.

By using the present invention, high frequency components can be employed for the induction heating process. High frequency generally relates to radio frequency and primarily frequency exceeding 25 KHz. The preferred embodiment employs at least about 50 KHz; consequently the components can be relatively small to reduce the weight of he components and, thus, the mass for the purpose of reducing acceleration forces and momentum so that the equipment can be operated at the necessary high speeds to make the invention acceptable for high speed sealing of containers. Consequently, the thermal sealing technique is performed by high frequency power to reduce the mass and associated inertia for high speed operation. Since high frequency components can be used in practicing the present invention so that the inductor itself and the associated electrical transmission structures for directing electrical energy to the heating process itself need not include liquid cooling. Consequently, the normal procedure for induction heating apparatus wherein liquid cooling is required is overcome by application of unique concepts that allow high frequency operation of the apparatus. By employing the present invention, not only can the heating process be performed at high speeds; but, dry switching and high energy distribution from a single power supply is obtained by a multiplexing arrangement which does not hinder the accurate control over heating of each container. Each container is processed in a fashion which essential guarantees that a seal is formed at the desired consistency in a footprint extending completely around the access opening of the container. In this fashion, and by using the present invention, high speed sealing is accomplished without sacrifice of the uniformity of the heat seal, together with a consistency of the heat seal that balances the diverse need for an air tight seal and a lid that can be peeled from the container uniformly, without requiring complex manual manipulative efforts.

The present invention also allows the application of discrete energy bursts that can be controlled for each individual sealing operation performed by the apparatus from one container to the next. As will be explained later, the invention employs a large number of discrete heating and sealing stations that are energized in series as the stations move along a preselected path in a fashion to allow sufficient time for each individual sealing operation to be performed at one position, while the lid is placed on the station at another position and as filled container is loaded onto the apparatus at another position. By employing the present invention, all of these functions necessary to seal a container can be accomplished in series to accomplish high speed operation while also providing sufficient time to evacuate air from the container and flush the container with gas. All of these functions require substantial time; but, they can be accommodated by using the invention without diminishing the overall production rate at which containers are sealed. The invention allows total automation of the sealing procedure so that the high speed production rates are accomplished on a large number of containers at a high speed without manual intervention.

By employing the unique technique of energy monitoring and control, each individual heating operation for a given container can be optimized to reduce the necessity for substantial and expensive post sealing quality control procedures. Consequently, by employing the present invention, the actual sealing procedure can be so meticulously controlled that the normal inspection and quality accuracy associated with food products may be decreased without sacrificing the overall confidence in the quality of the product being packaged. Thus, quality can be controlled by using the invention properly to reduce need for normal quality control checks, such as 100% pressure testing.

The present invention, as explained previously, relates to a concept of employing a high frequency power supply. In accordance with an aspect of the invention, this power supply has an output voltage which is compatible with a relatively long, high frequency transmission line and utilizes an impedance matching arrangement that compliments the lightweight, non-water cooled components associated with the present invention, so that the induction tooling equipment performing the actual sealing function can be placed and arranged on an apparatus to produce an optimum high speed operation. By incorporating the present invention, the heating function itself dictates the position, movement and operation of the actual mechanical devices causing the sealing. In the past, the heating equipment and manipulation devices associated with the sealing function dictated not only the speed at which the apparatus could be operated but also in what fashion these components would be arranged, assembled and operated. By employing high frequency and this aspect of the invention, the mechanical apparatus can be arranged and operated to optimize the sealing function, the ultimate purpose of this type of apparatus and method.

In accordance with another aspect of the present invention, a unique dry switching system is provided for distributing the high frequency power through electrical connections that employ a common, fixed power supply through a communicating type, switching plate for individually applying power, in sequence, to a number of individual heating and sealing stations as they all move on the apparatus. The dry switching of the high frequency power supply from one station to the other, in sequence, is accomplished by structural elements which are integral feaures of the lightweight rotary sealing apparatus. Consequently, the apparatus and its single power supply can provide a uniform individually controllable energy burst to each of the sealing stations at the sealing position as the stations move in succession through a fixed path brough he heaing position. In accordance with a preferred embodiment of the invention, a programmable controller is employed for establishing the heating and sealing cycle of an apparatus constructed in accordance with the present invention so that the single high frequency power supply can be multiplexed at the proper time through a novel dry switching arrangement to apply high frequency current through an inductor or heating ring to seal the lid onto the container. In a fashion current can be turned on and then turned off during a heating cycle tailored to seal a single container on a particular moving station.

By the concept of integrating the instantaneous power at the power supply, as a function of time, to create an energy signal representing the energy actually applied to a heating station during a specific monitored heating cycle can be used to accurately monitor he energy burst at each station. The summation of the energy output or burst during a heating cycle for a given container can be compared to a preselected desired reference energy level or burst for the purpose of controlling the amount of energy actually supplied to the induction heating inductor during each sealing cycle. Thus, an energy burst complying with the particular need of the container being processed is obtained. By employing the invention, the energy supplied to each individual container process, in sequence, can be controlled individually.

The present invention also relates to the concept of utilizing a heating unit carrying the heating ring using a unique and novel module construction that can be plugged into the system or apparatus at each moving heating station for the purpose of rapidly replacing a heating unit. This avoids lengthy down time and substantial replacement costs. Further replacement units can be available for use so the machine is inoperative for only a short time to change heating units.

The primary object of the present invention is the accomplishments of the improvements of the present invention, as set forth above, which improvements are obtained, in accordance with the present invention, by providing an improvement in a device for sealing a flat lid with a lower layer of heat bondable material onto the upper surface of a generally flat flange extending around the periphery of the access opening in a container for hermetically storing a substance susceptible to deterioration when exposed to atmosphere for a prolonged time. This device, which is improved by the invention, includes means for placing the lid over the flange with the layer of heat sealable plastic material sandwiched between the lid and the flange to define a closed loop sealing area with a shape defined by the lid and flange, a heating unit including a body, a heat energy transfer ring carried by the body with a shape generally matching the closed loop shape of the sealing area between the lid and container, means for forcing the heating unit against the lid to clamp the lid against the flange, means for causing the ring to heat the bondable plastic material in a closed loop pattern or footprint defined by the shape of the ring and means for removing the heating unit from the lid after the lid is bonded or set, at least partially. The invention is the improvement which involves providing means for moving the heating unit in a preselected path between first and second positions, a high frequency power supply in a fixed position relative to the moving heating units and means for energizing the ring with the fixed power supply as the heating unit is moving between the first and second positions to define a heating cycle. By employing the present invention, the high frequency power supply is fixed and the individual heating units can be movable with a slip ring or switch plate arrangement between the fixed power supply and the movable heating units carried on heating stations so that a plurality of heating units can be energized in succession by appropriate, successive operation of a single high frequency power supply which can be rapidly energized and de-energized.

In accordance with still another aspect of the present invention, there is provided a device for sealing a flat lid with a lower layer of heat bondable material, of the type defined above, onto a plastic container, which device includes a turret having a given number of circumferentially spaced stations, means for rotating said turret about a vertical axis whereby the stations move along a generally circular path, means for loading a container filled with the substance, such as a prepared food product, onto a station of the turret at a first position on the path, means for locating a lid over the filled container at a second position on the path, and means for heating the heat bondable material while the lid is forced against the flange of the container at a third position on the path whereby the lid is heat sealed onto the flange of the container. This heating means includes a heating unit located at each of the moving stations including a downwardly facing heating ring adapted to force the lid against the flange and electrical means for causing the ring to heat the lid in a pattern or footprint defined by the ring and extending around the flange periphery, whereby the heat bondable material is heated to a lid sealing temperature along the pattern at this third position. The electrical means for causing heating by the ring comprises a high frequency power supply fixedly mounted with respect to the rotatable turret, a dry switch plate having a number of circumferentially spaced contacts rotatable with the switch plate as it is rotated in unison about the axis, bus means on the turret for fixedly connecting each ring of each of the heating units at a given position to a selected contact of the switch plate, and brush means connected to the high frequency power supply and including brush contacts riding on the switch plate. The contacts on the switch plate are spaced to correspond with the given number of moving stations so that the heating units are energized, in succession, by the power supply to define a heating cycle occurring when the heating unit is at the third position of the path through which the heating unit is moved by the turret.

In accordance with still another aspect of the invention, the lid of the container is sealed onto the top of the container by a method employing the apparatus as defined above. In this manner, the basic objective is accomplished where a high speed machine and method of operating the machine allows accurate control of the individual heating cycles by employing high frequency, low mass components in a unique configuration producing a unique and novel overall system apparatus and method.

BRIEF DESCRIPTION OF DRAWINGS

In this disclosure, the preferred embodiment of the invention is illustrated in the following drawings:

FIG. 8 is a block diagram illustrating a power monitor concep to be used in the present invention;

FIG. 9 is a logic diagram, and partial block diagram and wiring diagram, of the control flow chart employed in accordance with the preferred embodiment of the present invention;

FIG. 9A is a diagram of a modification of the preferred embodiment shown in FIG. 9;

PREFERRED EMBODIMENT

Figure 1:
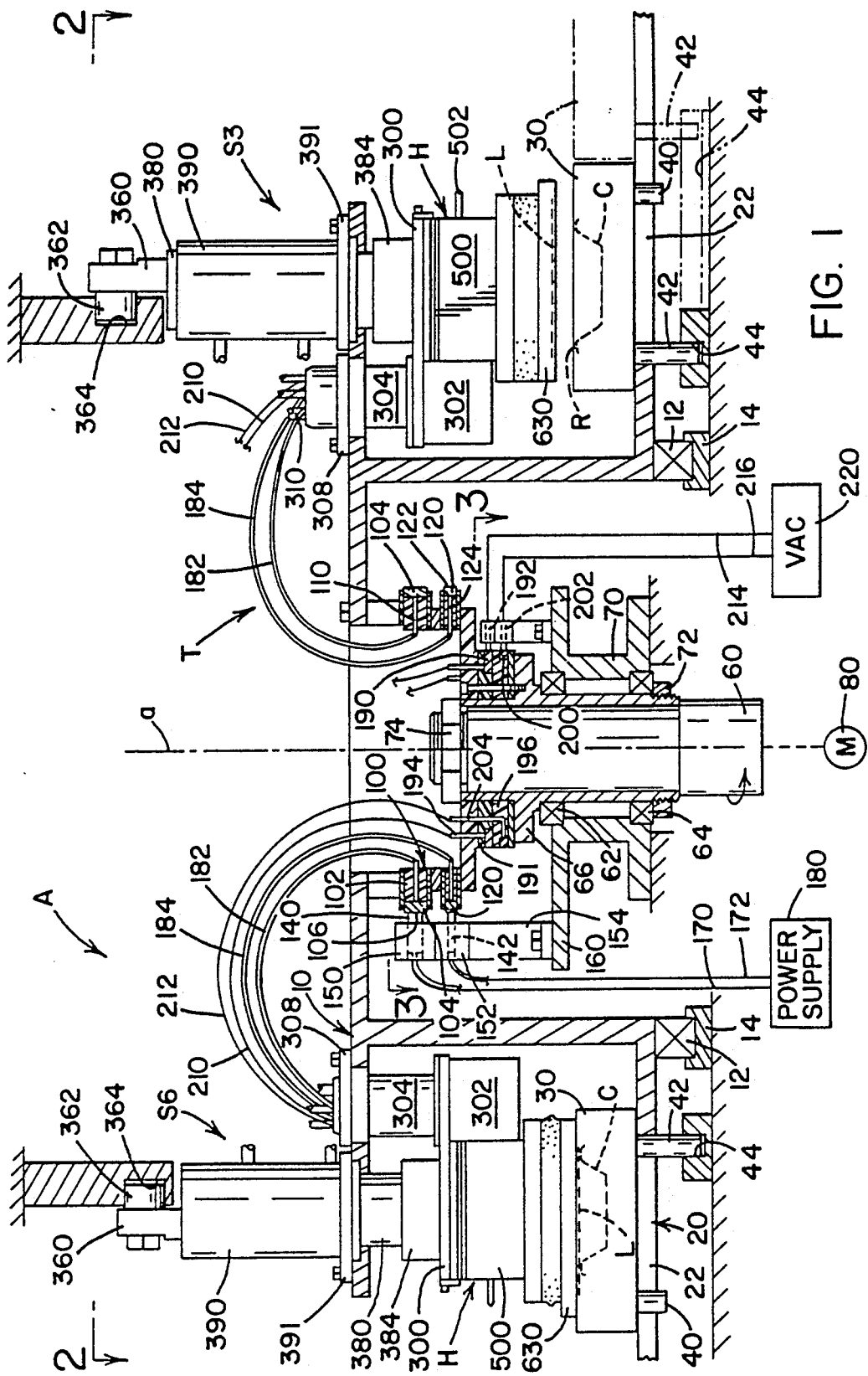
FIG. 1 is a side elevational view, somewhat in cross section, illustrating the preferred embodiment of the present invention.
Figure 2:
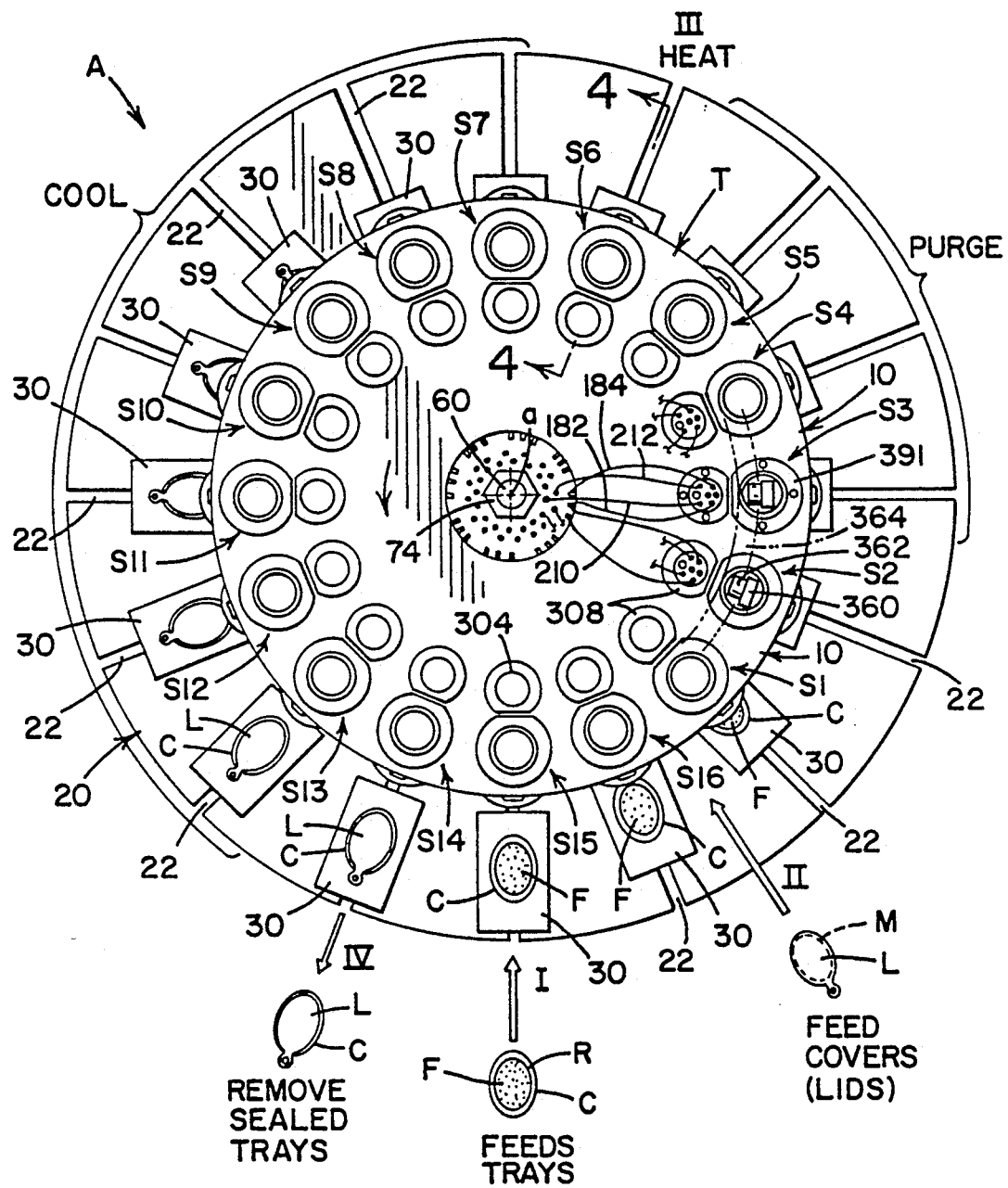
FIG. 2 is a top plan view taken generally along line 2—2 of FIG. 1.

Referring now to the drawings wherein the showings are for the purpose of illustrating a preferred embodiment of the invention only, and not for the purpose of limiting same, FIGS. 1 and 2 show an apparatus A for the purpose of bonding a lid L formed from laminated sheet material onto a container C containing a substance which can deteriorate by long term exposure to oxygen, such as a prepared food products. The food product is deposited into the container which is then loaded onto a turret T at loading position I shown in FIG. 2. Turret T is rotated to a position II where the lid or cover L is deposited over the filled container C. Thereafter, the lid is heated selectively around its periphery for the purpose of sealing the lid onto the top of the container to preserve food product F encapsulated within the container. As a primary support element turret T includes a rotating table 10 supported on bearing 12 in support race 14, as best shown in FIG. 1. Rotatable table 10 has a plurality of circumferentially spaced heating stations, identified as stations S1-S16, equally spaced in a circumferential direction around the outer periphery of table 10 to rotate about axis a. In the preferred embodiment of the invention, sixteen heating stations are provided on turret T; however, any number of circumferentially spaced heating stations could be used to practice the invention. Integrally formed with table 10 is a lower stabilizing plate or base plate 20 having a plurality of radially extending slots 22 for each heating station. Each heating station includes, as a separate element, a lower container supporting nest 30 adapted to receive the container C after it has been filled with the food product F. In the preferred embodiment, nest 30 at each station S1-S16 has downwardly extending, spaced posts 40, 42 adapted to ride within a slot 22 at each station so that the nest at each station can be moved radially inwardly or radially outwardly as the stations move in he direction of the arrow shown in FIG. 2. A variety of structures could be employed for reciprocating nest 30 in a radial direction on plate 20 as table 10 is rotated; however, in the preferred embodiment, post 42 is elongated and extends into a cam groove 44 which acts upon post 42 to move nest 30 in slot 22 as turret T rotates about axis a. As so far described, a filled container C is loaded onto its nest 30 at position I. The nest is then moved inwardly and lid L is placed over the container in the nest. Thereafter, nest 30 moves inwardly and is carried by turret T toward the heating location or position III. During this rotary movement, a vacuum is applied under the lid and inside the container to remove oxygen from the container. At heating station III, the lid L is inductively heated, in a manner to be explained later, for sealing the lid onto the container at flange or rim R. Until the lower layer of heat bondable material M is set, the lid is held against the container. When the seal has stabilized, the nest 30 is moved outward along groove 22 at a circumferential position shown as being between station S9 and station S16 in FIG. 2. Thereafter, when a station rotates to a position IV the sealed container is removed from apparatus A. If for some reason, there has been a detected defect in the sealing operation, the removed container will be ejected.

In accordance with the preferred embodiment of the invention, the heating process requires 200-400 ms for the actual heating operation to be accomplished. Since sixteen stations S1-S16 are spaced around turret T, the turret is rotated at approximately 4.0-5.0 seconds per revolution to produce approximately 200 sealed containers per minute. As illustrated in FIG. 1, turret T is rotated by shaft 60 about spaced bearings 62, 64 supported on the cylindrical body of a flanged sleeve 66 carried on shaft 60 to rotate about axis a and with respect to a lower fixed base 70. Sleeve 66 is clamped in position between collar 72 and upper lock nut 74. In this manner, constant velocity motor 80 rotates turret T so that stations S1-S16 move in a circular path about axis a with a single revolution, in accordance with the preferred embodiment requiring 4.0-5.0 seconds.

ROTARY SWITCHING

Figure 3:
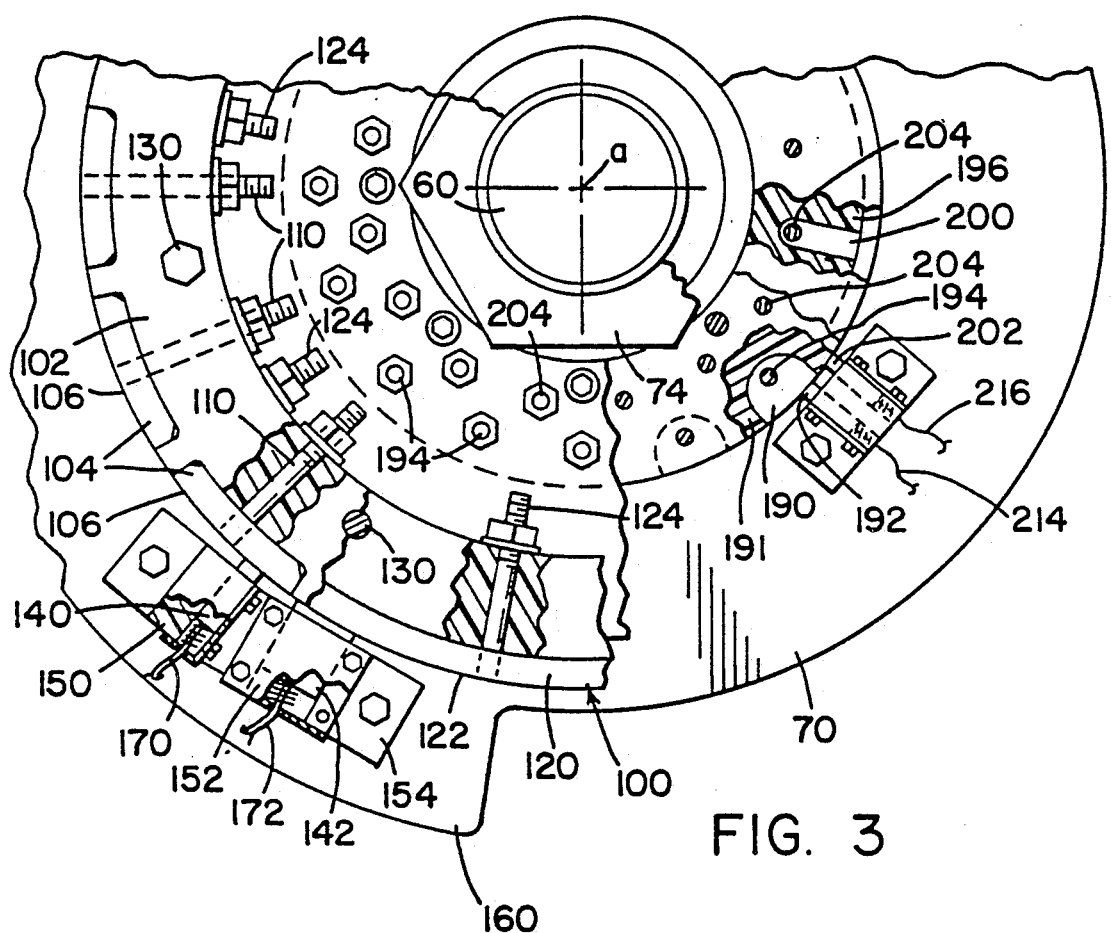
FIG. 3 is a partial cross sectional view taken generally along line 3—3 of FIG. 2.

Referring now more particularly to FIG. 3, taken together with FIG. 1, rotary switch plate 100 rotates in unison with turret T and includes a contact support ring 102 into which are mounted circumferentially spaced, upper power contacts 104 having outwardly facing arcuate outer brush supporting contact surfaces 106. Power contacts 104 are formed from a copper material to provide low electrical impedence and have a circumferential spacing which is essentially 1/16 portion of the path through which stations S1-S16 rotate. Each of the spaced contacts is connected to an inwardly directed terminal 110 so that electrical continuity exist between each contact 104 and its associated terminal 110 extending inwardly, as best shown in FIG. 3. A lower power contact ring 120 has an outwardly facing, circular brush engaging surface 122 and is connected to a series of circumferentially spaced terminals 124. Each station S1-S16 includes a terminal 110 and a corresponding terminal 124. Of course, a single terminal 124 could be employed since ring 120 is continuous; however, a plurality of terminals 124, one associated with each heating station on turret T, is for the purpose of preventing line differences in impedance of the bus network for directing power through the rotary switch plate to the individual heating stations S1-S16. Bolts 130 are spaced around support ring 102 for clamping rotary switch plate 100 into its assembled condition, as shown in FIGS. 1 and 3. A fixed upper brush 140 and a fixed lower brush 142 ride, respectively, on the upper segmented copper contacts 104 and the lower ring contact 120. Consequently, electrical connection is made between ring 120 and an individual contact 104 by the brushes 140, 142. These brushes are reciprocally mounted against an appropriate compressing spring in housings 150, 152 on fixed support stand 154. This stand is bolted onto plate 160 of base 70, as best shown in FIG. 3. Power leads 170 172 connect brushes 150, 152 across the ouput terminals of a 50 KHz, high power rated power supply 180. A separate set of leads 182, 184 is connected to terminals 110, 124, respectively, of each heating station S1-S16 so that leads 182, 184 can be individually connected directly to the heating unit at these individual heating stations S1–S16. The heating units energized by power leads 180, 184 will be described in more detail later. As illustrated in FIGS. 1 and 3, it is possible to provide rotary switch plate 100 with additional, or auxiliary, communicating systems such as a second set of contacts to provide electrical communication between a fixed appliance or meter on apparatus A and each of the individual rotating heating stations S1–S16. To illustrate optional features, contacts 190 are circumferentially spaced about support plate 191 formed from insulating material. hese contacts coact with spring bias brush 192 and are electrically connected with a terminal 194 at each station S1–S16. A lower secondary contact plate 196 is fixed below plate 191 and has circumferentially spaced, narrow contacts 200 coacting with a lower spring biased brush 202 for electrical communication with a terminal 204 associated wih each contact 200. As turret T rotates, brushes 192, 202 electrically connect fixed leads 214, 216 with one of sixteen sets of leads 210, 212. One set of leads 210, 212 is provided for each heating station S1, S16. In this illustrated embodiment of the invention, the secondary commutation system is used for a vacuum meter 220 to monitor signals through leads 214, 216 indicative of the vacuum in a specific container. Brushes 192, 202 direct a signal from an active set of leads 210, 212 on a given heating station to the fixed or stationary meter 220. Of course, other metering devices could be employed utilizing the secondary commutation system or second rotary switch plate concept for detecting conditions at the individual heating stations S1, S16 as they are roated by turret T. In accordance with the invention, the basic inventive concept is in the area of controlling energy from power supply 180 and directing that energy through leads 182, 184 to the individual heating station at the heating position shown as the position of station S6 in FIGS. 1 and 2. The other draw rotary switch or second commutating nework system is auxiliary to this primary concept. he commutation position need not be at any particular location around axis z, as long as it can sense the desired parameter or condition for which it is designed.

HEATING STATIONS

Figure 4:
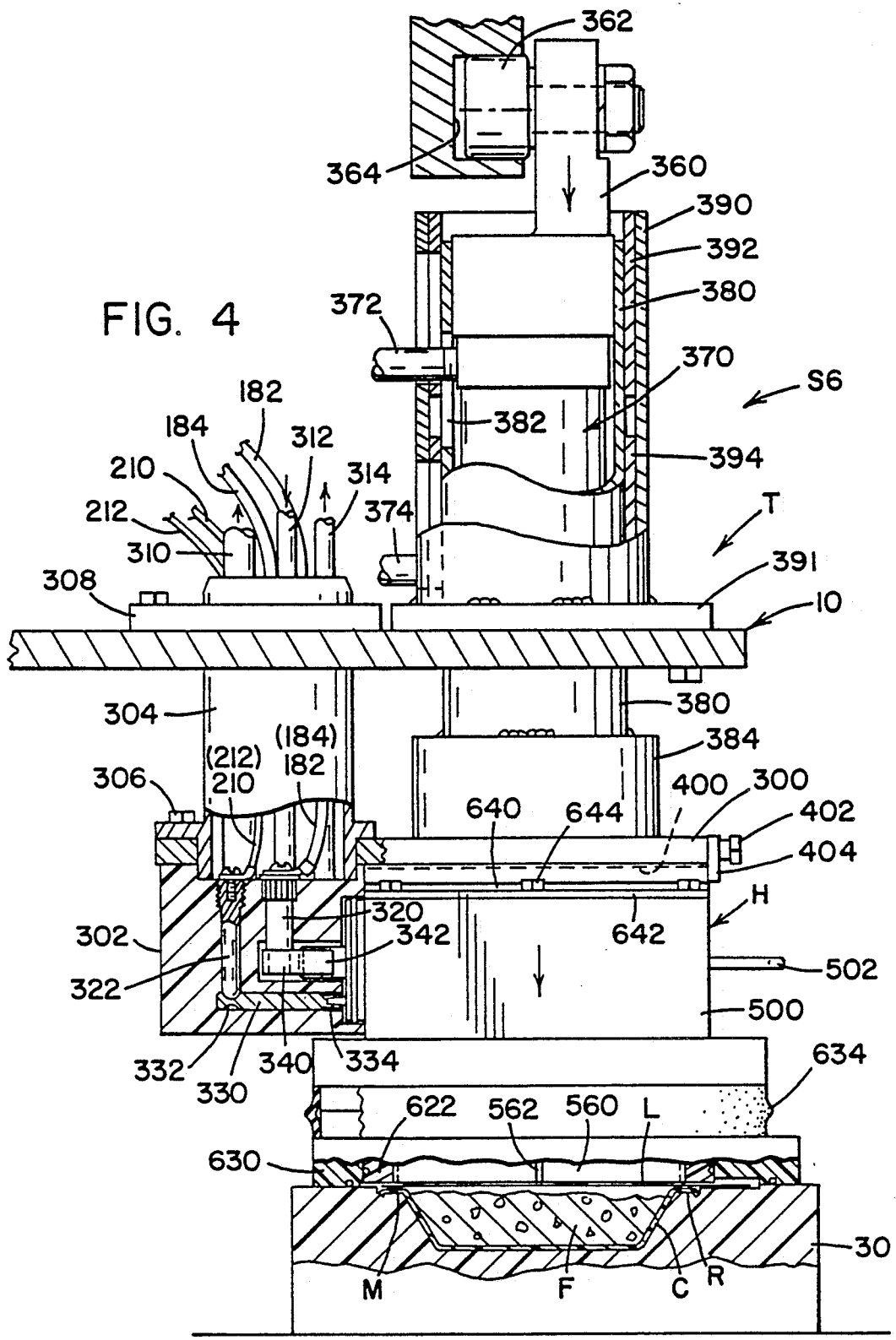
FIG. 4 is an enlarged, partially cross sectioned, partial side elevational view of the preferred embodiment of the present invention illustrating a single station.
Figure 5:
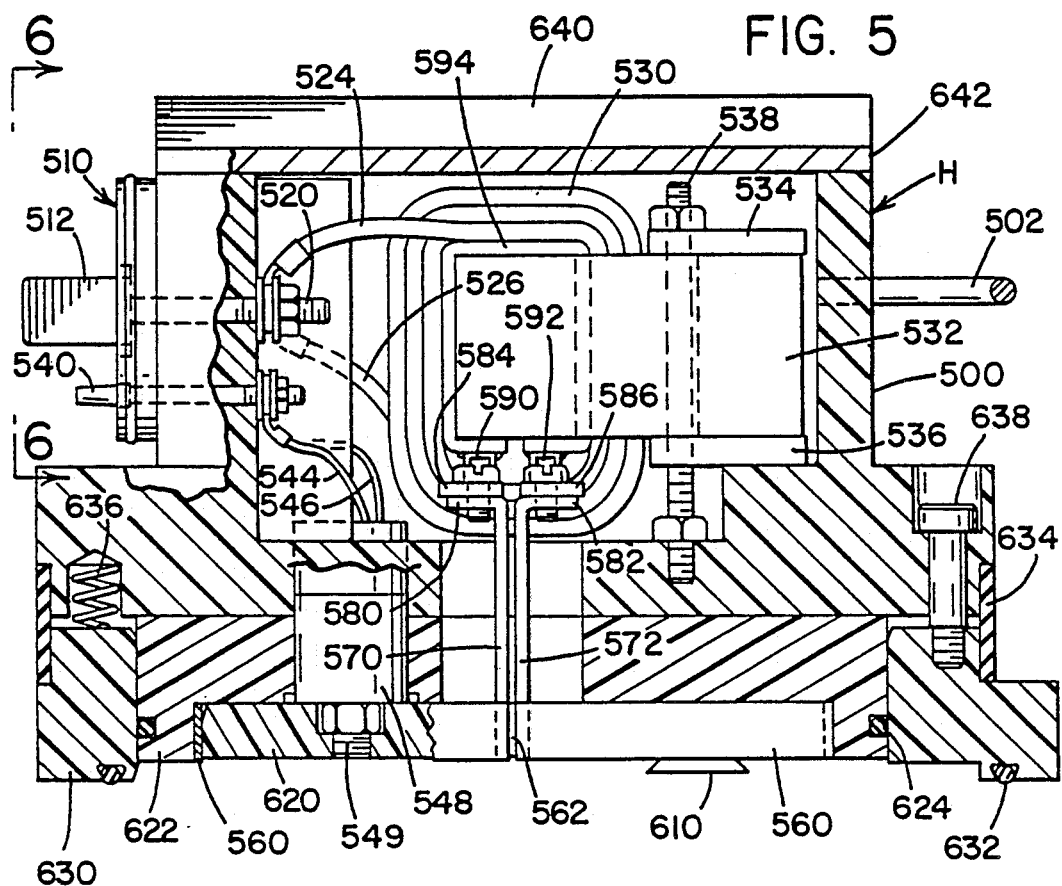
FIG. 5 is a cross sectional view of the heating unit module employed in the preferred embodiment of the present invention.
Figure 6:
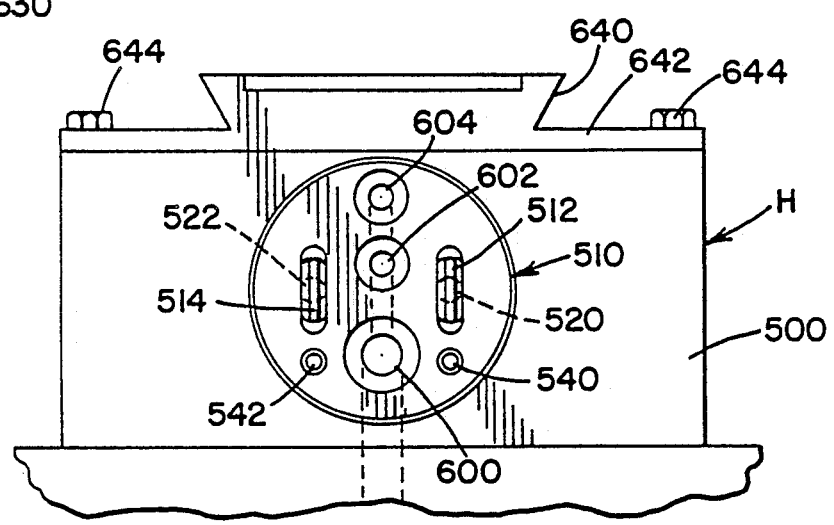
FIG. 6 is a cross sectional view taken generally along line 6—6 of FIG. 5.

Since each of the heating station S1–S2 is structurally identical, only heating station S6, illustrated in the heating position III, will be described in detail and this description will apply equally to the other heating stations circumferentially spaced around turret T and supported on table 10. As illustrated in FIGS. 4, 5 and 6, the heating station employs a modular heating unit H which is replaceably supported on reciprocal platen 300 adapted to force the heating unit downwardly into the sealing and heating position, as shown in FIG. 4, then reciprocated upwardly into the retracted position. This upward disposition of unit 14 allows loading of container C onto nest 30 at position I and loading of lid L onto the outer flange R of the container C at II. Platen 300 carries a lower, downwardly extending connector block 302 formed of insulating material and connected to an upwardly extending protective tube 304 secured onto platen 300 with block 302 by a number of bolts 306, only one of which is shown. These bolts extend through the flange on tube 304 into block 302. Protective tube 304 reciprocates in a guide 308 secured to table 10 of turret T as heating unit H is reciprocated vertically. Although not part of the invention, within the protective tube are a plurality of conduits 310, 312 and 314 used to draw a vacuum in container C by conduit 310 and to purge the interior of the container by passing a protective, inert gas into the container through conduit 312 and out through conduit 314. This vacuum and purging function of apparatus A assures that a minimum amount of oxygen is in the container when it is sealed. Removing ambient gas from the container is standard in the food packing industry and is illustrated to acknowledge that this function can be performed by novel apparatus A.

In accordance with an aspect of the invention, heating unit H is movable by hand laterally into block 302 for the purpose of connecting conduits 310–314 and, more importantly, power leads 182, 184 for subsequent energizing of the inductor or heaing ring used in practicing the present invention. A number of structures could be employed for rendering the electrical connections quick-disconnect devices; however, in accordance with the preferred embodiment of the invention, a pair of terminals 320 and a second pair of terminals 322 are fixed in the insulating of block 302. Terminals 320, only one of which is shown, are each connected to one of the power leads 182, 184. In a like manner, smaller terminals 322, only one of which is shown, are connected individually to one of the auxiliary control or signal leads 210, 212. This auxiliary electrical connection or secondary network, which may or may not be used, includes a pair of cylindrical contacts 330, only one of which is shown. This contact has an annular groove 332 at one end of the purpose of engaging terminals 322. Female coupling members 334 coact with male coupling members on removal of heating unit H, to be explained later, for the purpose of interconnecting two terminals of the unit or module H with the two terminals 322 in block 302. For the purpose of directing high frequency power to the unit or module H for the purposes of heating plastic heat bondable material M to the sealing temperature, a pair of ring contacts or clamp 340, only one of which is shown, are secured around the ends of the terminals 322. Each contact clamp 340 has an outwardly extending alligator type, spaced coupling member 342 to coact with a corresponding male blade or coupling member in heating unit H and shown in FIGS. 5 and 6. Movement of heating unit H laterally toward block 302 engages the coupling members on the heating unit with the four female coupling members 334, 342. Movement in the opposite direction away from block 302 opens these four electrical connections. In this manner, heating unit H is modular in construction and can be moved laterally against the block 302 for the purposes of rapidly connecting or disconnecting the main power leads 182, 184 and any auxiliary electrical signal leads 210, 212 at each of the individual heating stations.

Lateral movement of module or heating unit H engages the heating unit with the lower portion of reciprocal platen 300 which can be reciprocated vertically to force the heating unit downwardly into the heating position shown in FIG. 4 and upwardly into the retracted position to allow loading of the container and lid onto nest 30 for the purposes of subsequent evacuation of air from the container and, then, sealing of the container by the heating unit H, in a manner to be explained later. To cause controlled reciprocation of platen 300, the preferred embodiment of the present invention includes a forcing means or ram 360 having an upper extension carrying cam follower 362 adapted to ride in circular cam slot 364 concentric with axis a of turret T. Ram 360 carries a double acting cylinder 370 having a line 372 for forcing the cylinder downwardly by extending the ram and a line 374 for moving the cylinder upwardly by reracting the ram ino he closed position. The operating element or ram of fluid operated cylinder 370 is connected to a lower reciprocal sleeve 380 so that it can be reciprocated with respect to ram 360 by operation of the cylinder 370. To allow this movement of sleeve 380 with respect to ram 360, clearance slots 382 are provided within sleeve 380 for both line 372 and line 374. The internal reciprocally mounted ram 380 is connected to platen 300 by a block or connector 384 adapted to be bolted onto the platen by an arrangement, not illustrated or required for the understanding of the present invention. Support tube 390 is fixed onto plate 10 by a flange 391 and carries cylindrical sleeve bearings 392, 394. In this manner, sleeve 380 can reciprocate within support tube 390 and ram 360 can also move within the support tube. A female section 400 of a dovetail connection is fixed onto the lower surface of platen 300 so that a male dovetail of heating unit H, shown in FIGS. 5 and 6, can engage female section 400, as heating unit or module H is moved laterally against block 302. An end clamp or lock plate 404 is secured by a plurality of nuts 402 onto platen 300 for locking heating unit or module H in operative position.

As the heating stations S1-S16 rotate around axis a, cam follower 302 rides in cam slot 304. This slot causes the various heating units H to be moved downwardly into an operative position with the heating unit H adapted to move downwardly against nest 300. Thereafter, fluid is introduced into line 372 which extends cylinder 370 and forces the heating unit downward a distance even further than the throws of cam slot 364. This force can be controlled so that the desired pressure is applied onto the lid by the heating unit H for the purpose of creating the pressure for holding the lid in place and forcing the lid downwardly during the heating operation. Consequently, cam slot 364 and cam follower 362 shift the heating unit into the operative position with the container generally in an air tight area under unit H. Then the desired pressure is applied against the heating unit to drive the rest of the heating unit downwardly to exert the desired pressure between the heating ring, to be explained later, and lid L for the purposes of forcing the lid into is sealing position with respect to the outer peripheral flange or rim R of container C. The heat bondable plastic material layer M is between flange R and lid L. In practice, the lower surface of the metallized sheet material forming lid L is coated with the plastic bonding material M so that the bonding material is activated only in the area below the heating ring and between the lower surface of the lid and the upper surface of flange R. After the heat sealing has occurred, pressurized fluid in line 374 retracts the downwardly extending he ram of cylinder 370 to move platen 300 upwardly. In addition, ram 360 is shifted upwardly by cam slot 364.

HEATING MODULE H

Figure 7:
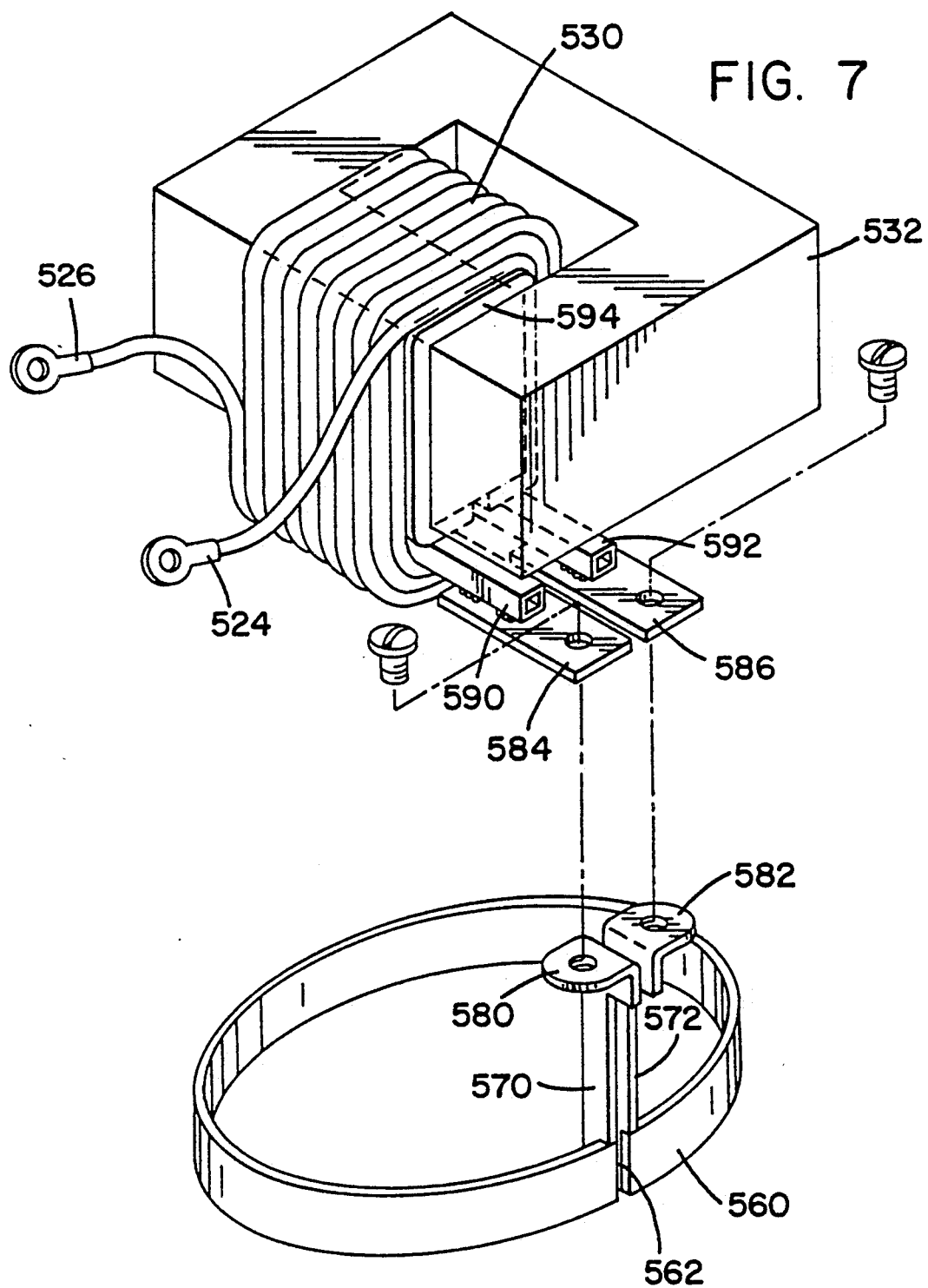
FIG. 7 is a partial, pictorial view showing the inductor and matching transformer employed in the heating unit module of FIGS. 5 and 6.

Referring now more particularly to the heating unit or module H as best illustrated in detail in FIGS. 5-7, the individual modular heating units comprise a body 500 formed from an insulating material and including an outwardly extending handle 402 for sliding the heating unit into the assembled position shown in FIG. 4 against block 302 and attached onto the ram 360 at platen 300. At the side of body 500 facing block 302 there is provided a connector 510, best shown in FIGS. 5 and 6, and including power coupling leads 512, 514 connected to terminals 520, 522, respectively. Power leads 524, 526 of primary winding 530 are connected across terminals 520, 522 to create an electrical circuit with high frequency power supply 180, shown in FIG. 1, when the rotary switch blade connects a particular heating station S1-S16, as turret T moves the heating station past the contacts coacting with brushes 140, 142 at the heating position III. A square transformer core 532 has a straight leg surrounded by the primary winding and is supported on block 500 by spaced support plates 534, 536 secured onto the block by a spacing bolt 538 as shown in FIG. 5. Thus, when the heating station is in the heating position III, high frequency power is directed through primary winding 530 from coupling blades 512, 514. Signal connectors 540, 542 are also provided on connector 510 for directing vacuum signals from the heating station to the brushes 192, 202, as previously described. This concept is an additional feature made available by the present invention. These electrical connectors 540, 542 engage coupling members 332 shown in FIG. 4 and blades 512, 514 engage coupling members 342, as previously described. Thus, movement of heating unit H toward block 302 makes the eletrical connections assembled at connector 510.

In accordance with the preferred embodiment of the invention, the heating ring for heating the heat sealable or bondable material to a bonding temperature is accomplished by an induction heating arrangement including a heating ring in the form of an inductor 560 and having a shape which dictates the footprint or pattern of a sealed seam around flange R of container C. Thus, the shape of inductor ring 560, which engages the lid L and forces the lid against flange R, determines the pattern of heating the lower adhesive surface of the material forming lid L to a bonding temperature. This same ring holds the lid against the flange until the sealing has been accomplished, or stabilized to the extent that pressure can be removed by lifting ring or inductor 560 away from the lid after the sealing operation. Ring 560 is especially designed with the shape of container C and its flange R. Container C and ring 560 are oval in the illustrated embodiment.

Ring 560, is a single turn inductor having a gap 562 defining ends of the inductor connected to fishtail leads 570, 572 which extend upwardly from the inductor, as best shown in FIGS. 5 and 7 Brackets 580, 582 are integrally formed with leads 570, 572, respectively, to provide a flat electrical interface connection between the brackets and plates 584, 586 which are soldered to hollow extensions 590, 592 at opposite ends of the single turn secondary 594 wrapped around the same leg of core 532 as primary winding 530.

By providing this module design for unit H, the matching transformer formed by primary winding 530 and secondary winding 594 provides impedance matching and reduces the length of the electrical circuit from the secondary winding to the inductor itself. Thus, there is excellent impedance matching characteristics and low power losses. This feature is instrumental in providing uniform operation of each unit H so that the energy burst when measured at the power supply is an accurate representation of the actual power being employed at the inductor or ring 560. By providing this compact modular concept with a high frequency transformer in the module itself, high voltage can be applied from the power supply to the primary. This use of high voltage over the major distance of electrical energy transmission reduces energy losses by the transmissions lines from the single power supply 180 to module H. High current flow and low voltage electrical energy flows only in a very short, low impedance electrical circuit in the module. The secondary winding and inductor 560 have low impedance and they are not water cooled. By being relatively large in mass and short in electrical circuit length, ring 560 cools rapidly after it heats the metal layer provided on the material forming lid L even without a circulated collant.

On connector 510 there are also illustrated a vacuum coupling 600 and purge couplings 602, 604 which are coupled to conduits 310, 312, 314, respectively, within block 302 by normal quick-disconnect couplings of somewhat normal construction. Thus, the fluid lines and electrical contacts in module H are made and established when the unit is moved into engagement with block 302, as shown in FIG. 4. A nozzle element 610, shown in FIG. 5, is used for directing the reduced pressure from vacuum coupling 600 into the interior of the container before the lid is in place. Other arrangements could be employed for both vacuum evacuation of the container and gas purging of the container which is accomplished by apparatus A as the individual heating stations S1–S16 are moved in the circular path by turret T.

To support inductor 560 onto body 500, there is provided an internal support plate 620, which may include flux concentrators, and an outer inductor holder 622 which can also include flux concentrators. The support plate of holder sandwiches the inductor to rigidify it for the purpose of allowing the inductor to create pressure against the lid as the lid is forced into place by the lower portion of holder 622. Thus, the holder 622 and inductor 560 engage the upper surface of lid L for forcing the lid downwardly. Thereafter, high frequency power is supplied to heating unit H from power supply 180 by way of the rotary switch plate to cause a current flow in the inductor of unit H. This induces high frequency current flow adjacent inductor 560 in the metal layer of the laminated lid for the purposes of heating that metallized layer below ring or inductor 560. This in turn heats the adhesive or plastic, heat bondable material on the lower surface of the lid for sealing the portion under the inductor onto the flange R of container C. An outer O-ring seal 624 seals holder 622 with respect to a reciprocal hold down ring 630 having a downwardly extending O ring seal 632 for engaging the upper surface of nest 30, as shown in FIG. 4, for providing a seal around the nest so that the area above the container can be evacuated and gas purged as previously described. Thereafter, lid L is forced into place by the lower surface of inductor holder 622 and the inductor itself for the purposes of forcing the lid into the sealing position preparatory to heat sealing by on induction heating process.

To support heating unit H on platen 300, there is provided a male dove element 640 on an integral plate 642 bolted to the upper surface of body 500 by a plurality of transversely spaced bolts 644 best shown in FIG. 4. As modular heating unit H is moved transversely into the operative position, dovetail element 640 engages element 400 for coupling the replaceable modular, heating unit H with block 302. The electrical connections are made and unit H is captured by platen 300 for reciprocation as described above.

HIGH FREQUENCY HEATING AND ENERGY CONTROL

Power supply 180 is fixed relatively to rotating heating stations S1–S16. The high frequency is a radio frequency greater than 25 KHz and preferably greater than 50 KHz. In practice, the power supply is a 50 KHz solid state inverter having a high voltage output for transmission along relatively long bus lines between the power supply and the individual contacts of the rotary switch plate. In this manner, there is a relatively low current flow and loss through the input bus network. Since the output bus network is essentially the electrical components in the heating unit or module H, there is relatively high efficiency from the power supply to the individual inductors 560 at the various heating stations. In accordance with the present invention as described in the introductory portion of this disclosure, the actual energy supplied to each heating station for processing and sealing each lid onto a given container is monitored by a power monitor network schematically illustrated in FIG. 8. An appropriate volt meter 700 measures the instantaneous voltage from the power supply and an appropriate current transformer 702 measures the instantaneous current flow as indicated by current meter 704. In accordance with standard practice, these two instantaneous signals, one representing instantaneous voltage and one representing instantaneous current from the power supply itself are measured at the power supply and are combined by a watt meter 710 to create an instantaneous watt voltage signal output in line W. In accordance with a modification of this general concept, it is possible to create a constant trace or sampled trace for both the voltage and current as indicated by blocks 512, 514. These traces can be compared by a microprocessor with a fixed trace stored in memory in accordance with standard power monitoring techniques to determine whether or not the instantaneous voltage or current profile for a particular heating cycle deviates beyond preselected limits from a fixed trace or profile. Of course, other arrangements could be provided for obtaining the instantaneous power supplied during a heating cycle performed at an individual heating station being driven or energized by power supply 180. The arrangement illustrated in FIG. 8 is schematic in nature and is used only to illustrate that the current and voltage is combined to produce an instantaneous power signal. Of course, the power signal could be introduced into a trace, recording or reading device, including a preselected profile, for the purposes of determining variations in the power as well as variations in the current and voltage. In some instances, the power supply can be monitored to produce variations in the power factor between the current and voltage which power factor variation is introduced into a trace device or network having a fixed profile or map so that the differential in measured power factor can be employed to determine such things as misplaced lids and other defects which will cause a rejection of a particular lid being processed. Thus, if the lid is misplaced or a sealing operation is improperly accomplished, this defect can be identified by one of the trace devices as measured by current, voltage, power and/or phase shift. The schematic diagram shown in FIG. 8 is the input for accomplishing these objectives and creates a power signal represented by line W between the power supply portion of the circuit and heating unit H. The interrupted portions x, y are indicative of the communicating connection between the fixed power supply and control system at the left and the rotary at the right. Of course, the quick disconnect arrangements are not illustrated. An inductor 720 is illustrated as being in the secondary bus network of the power supply itself to improve the efficiency of energy transferred by smoothing variable conditions.

Referring now to FIG. 9, details of the control of power supply 180 to dictate energy profiling during the treating cycle is illustrated. As a background control, power supply 180 is initiated, i.e. turned on, at time T1 and is stopped, i.e. turned off, at time T2 which is a microprocessed or created signal to override the energy control system and establish a maximum cycle time as will be explained later. Referring to the logic diagram of FIG. 9, which is used to explain the energy control system starting element, illustrated as flip flop 800 is reset upon an output signal 862a from AND gate 802. The CONTACT terminal of this gate indicates that there has been an electrical connection between the brushes and the moving contact at a heating station to which an energy brush is to be directed for heating the bondable material. In other words, when there is electrical contact a CONTACT signal is created. At the starting time, thereafter, a T1 signal is created by the microprocessor and an output appears in line 802a. This turns the radio frequency power supply 180 on. Power is then supplied to inductor 560 of the particular heating unit in the heating position until the power supply 180 is deactivated. The concept represented by flip flop 800 provides an override deactivation circuit for turning the power supply off before the dry switch is disconnected. A $\overline{\text{CONTACT}}$ or time T2 signal from the microprocessor appearing at the input of OR gate 804 to set flip flop 800 when the time expires (T2) or contrast is to be broken. The $\overline{\text{CONTACT}}$ terminal is at a logic 1 as the electrical contact between the rotary switch plate and the rotating heating station are near disengagement. $\overline{\text{CONTACT}}$ indicates when there is to be disengagement of the sliding contact and brushes. When that condition is approaching, a logic 1 appears at gate 804, which sets flip flop 800 to produce a logic 1 in output line 800a to energize a signal light 800b or other type flag. This condition is not, in the preferred embodiment, a preferred mode of operation. Power supply 180 should be deenergized before approach CONTACT position. The CONTACT signal is an override to assure that the power from the power supply is turned off before there is a break in the electrical connections which could cause harmful arcing. Another way to prevent this harmful arcing is the provision of the terminating time signal T2 created by the microprocessor. This signal forms the other input of gate 804. Consequently, at the end of a time period (T1-T2) or when there is a sensed positionally condition that the contacts are ready to separate, flip flop 800, or another appropriate programming device, is energized to deactivate the power supply. This is indicated as a reject condition by a programming scheme schematically illustrated as a reject light 800b. In the preferred embodiment of the invention the length of the heating cycle is not controlled by either the physical position of the heating unit or a fixed time indicative of the T2 condition. However, in accordance with the broadest aspect of the invention, both of these inputs, i.e. T2 or the approach of $\overline{\text{CONTACT}}$ could be employed for deactivating the power supply. This method and system could be incorporated with the turret concept to produce satisfactorily sealed containers; however, the present invention is technically advanced over that rudimentary control of the basic concept of the present invention.

In accordance with a novel operating procedure used in accordance with another aspect of the invention, power supply 180 is controlled by an energy monitor schematically represented as block 820 having an input 822 indicative of instantaneous wattage from output line W of watt meter 710 in FIG. 8 and a clocking or time input 824, which is indicative of real time t. The output of energy monitor 820 is the accumulated energy of a single burst used in a single heating cycle, as measured by the summation of the product of input terminals 822, 824. This accumulated energy appears as a voltage level or an incremented digital signal in line 826. Energy monitor 820 is reset at time T2 from the microprocessor, as indicated by reset line 828. Thus, a microprocessor created signal at input 822 resets the energy monitor to accumulate the energy for the next successive heating cycle of power supply 180, which is initiated by a signal in line 802a to enable the energy monitor as indicated by ENABLE line 830. Thus, energy monitor 820 is started and accumulates the actual energy being directed from power supply 180 to inductor 560 when a signal appears in line 830. The energy monitor is reset and waits for the next heating cycle by a microprocess or created time T2 signal in line 828. The accumulated energy in a given heating cycle appears in output 826 which is directed to a compare network 840 for comparing the accumulated energy from energy monitor 820 with a preselected energy limit from an energy limit stored in the microprocessor memory, illustrated conceptually as block 842. The preselected and/or microprocessor created magnitude of output energy is directed by line 844 to comparator 840 so that the digital or voltage signal in line 826 is compared to the same type signal in line 844 by comparator 840. When a comparison has been acknowledged, indicating that the desired amount of energy has been used in a given heating cycle, an output signal appears in line 846 and is directed to OR gate 850 having, as its second input, the output logic of flip flop 800 on line 800a. Thus, when the desired amount of energy has been supplied for a heating cycle, a signal or logic on line 846 creates a logic 1 in output 852 of gate 850 to turn off or deactivate power supply 180. This power supply can be turned off by the override signal in line 800a caused by either a time out at T2 or an approaching contact break, either of which will cause an output signal from OR gate 804.

Figure 10:
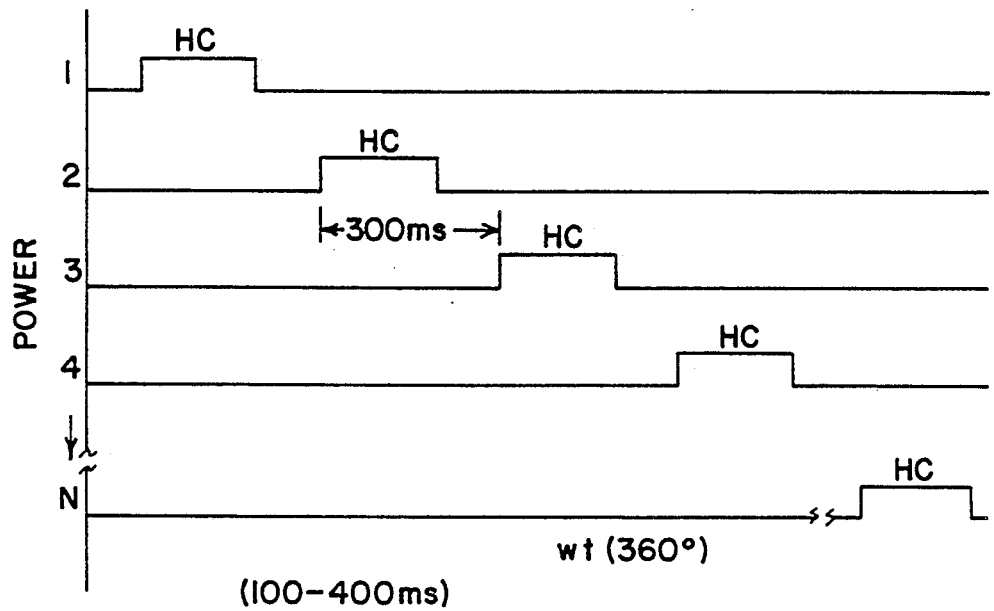
FIG. 10 is a graph illustrating the power multiplexing of a single power supply to the individual heating units of the preferred embodiment of the present invention.

In the simplest form of the energy monitor and comparator network contemplated by the present invention, the stored amount of energy in energy limit device 842 is a fixed magnitude. Thus, when the fixed amount of energy is developed by the power supply during a given heating cycle, the power supply is deenergized. In accordance with still further improvements in this basic concept, there is provided an arrangement including a further storage location in the microprocessor memory for identifying which of the various stations (S1-S16) is being processed. Thus, the energy limit can be loaded from memory for a particular energy burst for a particular heating station as represented by block 860. In this manner, each heating station can have its own preselected premapped stored energy for the heating cycle. In addition, the energy limits can be modified on a real time basis by using an I/O network to produce test points as indicated by lines 862, 864. Parameters, such as trend analysis or actual physical conditions existing at each of the various heating stations, can be inputted to modify the actual energy level for each of the various positions. Consequently, by using the present invention, if it is found that the energy levels for one particular station has a trend, the trend can be detected as a real world condition by sensing test points and the energy level can be modified or monitored. To perform this function, there is illustrated a recorder network 870 which can be enabled by the starting signal T1 created by the microprocessor and can be disabled by the OFF signal in line 874. The microprocessor identifies the particular heating station being monitored and recorder network 870 records the energy employed for that particular heating cycle. In addition, the energy burst can be integrated with respect to time to produce a recorded trace of the energy similar to the current, voltage and power trace set forth in FIG. 8. Recorder network can be employed for data tp adjust the set points of the energy limit 842 and can also be employed for the purpose of quality control and trend analysis. Referring now to FIG. 9A, the instantaneous power and time can be integrated between T1 and T2 by an integration circuit 900 and summed, if necessary, in accumulator 904 to produce a unique power/time integration for incrementally summarizing the total energy delivered to the inductor by incrementally multiplying the true kilowatts by time. This particular integration is advantageous for high speed reading rates to handle the short heating cycle length involved in this particular embodiment of the invention, which cycle lengths are between 100–400 ms. These heating cycles are schematically illustrated in FIG. 10 as being approximately 300 ms and occurring sixteen times during a single revolution of the turret T. Thus, the heating cycle HC and the waiting period between the heating cycles is approximately 100–400 ms. Each of these heating cycles is a particular cycle, controlled by the circuit schematically illustrated in FIG. 9. Of course, this circuit is normally digitally controlled by a microprocessor and the blocks and gates are used to illustrate the operating characteristics of the program employed in cycle the microprocessor. The showing is not indicative of actual hardware circuitry employed in practicing the invention.

Figure 11:
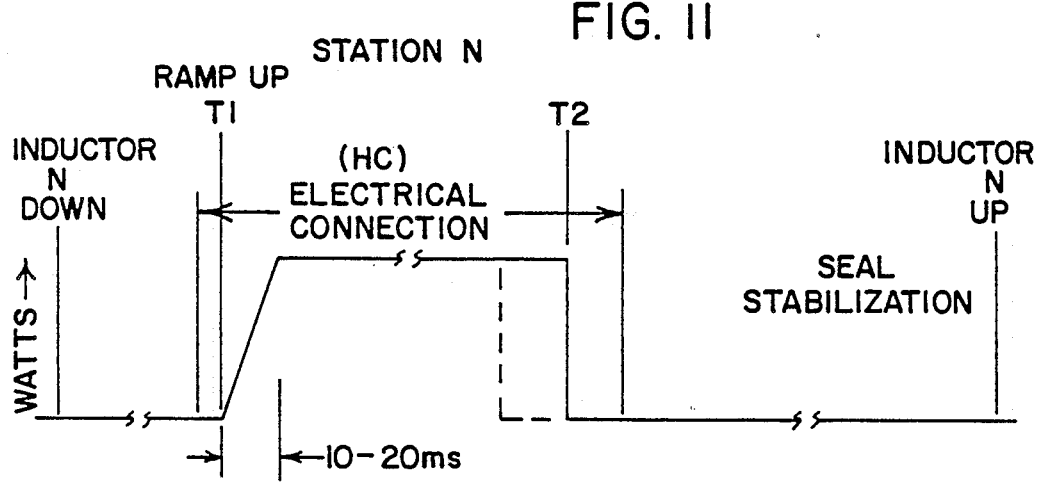
FIG. 11 is a power curve showing in detail certain timing functions and the shape of the energy burst employed in accordance with certain aspects of the present invention; and, FIG. 12 is a modified power curve showing a different energy burst shape usable in practicing the present invention.

Referring now specifically to FIG. 11, heating cycles HC start when the inductor is moved down into the sealing position. Thereafter, electrical contact is made between the rotary switch plate and the fixed brushes for a particular one of the heating stations S1–S16. Thereafter, the microprocessor produces the time signal T1. If the electrical contact has been accomplished, a CONTACT signal is produced. j When both CONTACT and T1 exist, a signal on line 802 of FIG. 9 energizes power supply 180. In accordance with another aspect of the invention, the power supply is ramped up in less than 20 ms and preferably in the range of 10–20 ms, as indicated on FIG. 12, to the normal operating power level indicated by the upper generally straight line of each heating cycle HC. At time T2, which is before the electrical connection has been broken, power supply 180 is deenergized. In the preferred embodiment of the invention, this is a fault condition since the energy monitor 820 should deenergize heating cycle HC, as represented by the dashed lines, before a time T2. Thereafter, inductor or heating ring continues to press against the lid for seal stabilization to assure that the adhesive action of the heat bondable material has been set or fixed. Then the inductor is moved up and the next heating cycle HC is initiated.

Figure 12:
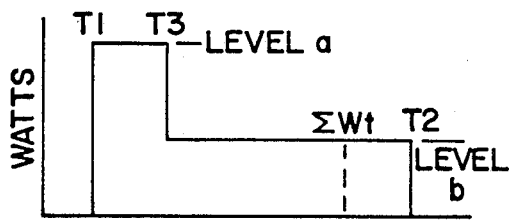

FIG. 12 illustrates a further modification of the present invention wherein the power level from the power supply 180 has two separate output levels a, b. In time T1, power is supplied at a maximum level a. At time T3, well before time T2, the power supply is shifted from this upper level a to lower level b and remains at this level until the accumulated energy limit has been reached or a T2 signal is created, which ever occurs first. This produces a relatively rapid heating of the bonding material to the heat temperature, then maintains this temperature for a preselected time preparatory to entering the seal stabilization area of the total operating cycle as illustrated in FIG. 11. This modification of the present invention is contemplated and does have some advantages which can be realized only with induction heating. The preferred embodiment of the invention uses the energy burst or cycle set forth in FIG. 11.

Having thus defined the invention, the following is claimed:

1. A method for sealing a flat lid with a lower layer of heat bondable material onto the upper, generally flat surface of a generally flat flange extending around the periphery of the access opening in a container for hermetically storing a substance susceptible to deterioration when exposed to atmosphere for a prolonged time, wherein said lid has a shape generally matching said periphery, said method including the steps of:
  (a) placing said lid over said flange with said heat bondable plastic material sandwiched between said lid and flange to define a closed loop sealing area with a shape defined by said lid and flange;
  (b) providing a heating unit including a body, a heat energy transfer ring carried by said body with a shape generally matching said closed loop shape of said sealing area;
  (c) forcing said heating unit against said lid to clamp said bed against said flange with said ring;
  (d) causing said ring to heat said bondable plastic material in a closed loop pattern defined by said shape of said ring;
  (e) removing said heating unit from said lid after said lid is bonded, at least partially, to said flange;
  (f) moving said heating unit in a preselected path between first and second positions;
  (g) providing a high frequency power supply in a fixed position relative to said moving heating unit; and,
  (h) energizing said ring with said power supply as said heating unit is moving between said first and second positions to define an heating cycle.

2. The method as defined in claim 1 including the further step of:
  (i) energizing and then deenergizing said power supply as said heating unit moves between said first and second positions.

* * * * *